W. A. SCHLEICHER.
BLANKET FASTENER.
APPLICATION FILED AUG. 26, 1919.

1,328,206.

Patented Jan. 13, 1920.
2 SHEETS—SHEET 1.

Witness
R H Balderson

Inventor
Wm. A. Schleicher
by his attorneys
Bakewell, Byrnes & Parmelee

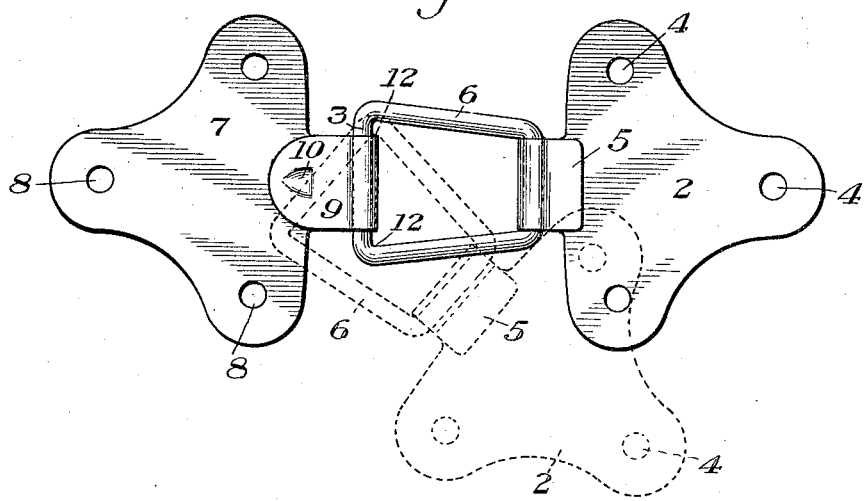
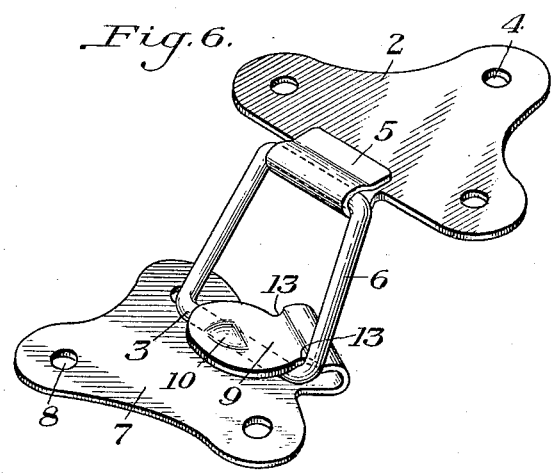

UNITED STATES PATENT OFFICE.

WILLIAM A. SCHLEICHER, OF CLEVELAND, OHIO.

BLANKET-FASTENER.

1,328,206.     Specification of Letters Patent.    Patented Jan. 13, 1920.

Application filed August 26, 1919. Serial No. 319,961.

*To all whom it may concern:*

Be it known that I, WILLIAM A. SCHLEICHER, a citizen of the United States, residing at Cleveland, in the county of Cuyahoga and State of Ohio, have invented a new and useful Improvement in Blanket-Fasteners, of which the following is a full, clear, and exact description, reference being had to the accompanying drawings, forming part of this specification.

This invention relates broadly to fasteners, and more particularly to separable fasteners adapted for use in holding the edges of blankets and the like in position.

The principal object of the invention is to provide a fastener of this type having one of the parts thereof so constructed that it provides means facilitating the engagement or disengagement of the other part of the fastener therewith.

Another object of the present invention is to provide a separable fastener having separable parts adapted to be secured respectively to the opposite edges of a blanket, or the like, which it is desired to hold in position and so constructed that the engagement or disengagement of the parts is facilitated by the provision of a fulcrum on one of the parts.

The foregoing and other objects, together with their attendant advantages, will be apparent as the invention becomes better understood by reference to the accompanying specification and the drawings forming a part thereof, it being premised that changes may be made in the details of construction within the scope of the appended claims without departing from the spirit of the invention.

Figs. 5 and 6 show modifications, and

Figure 1:
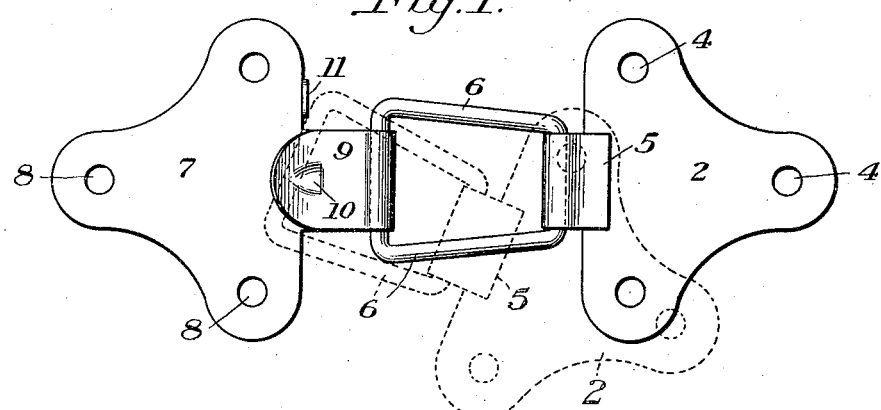
Fig. 1 is a plan view illustrating the parts of the fastener in engagement and the method of engaging the same.
Figure 2:
Fig. 2 is a longitudinal section through the parts in engaged position.

It has heretofore been proposed to provide fasteners of different types for securing the edges of blankets, robes and the like, in position. With the fasteners commonly used for this purpose it has been necessary to exert an undue force for engaging or disengaging the parts, whereby tearing of the material to which the fastener is connected has resulted. It is the purpose of the present invention to facilitate the engagement and disengagement of the parts whereby such tearing is obviated.

Referring more particularly to the drawings, there is illustrated a plate 2 of any desired configuration having suitable openings 4 formed therein for securing the plate to the blanket or other material with which the fastener is to be used. At one side of the plate 2 there is provided a tongue 5 bent over upon the plate to provide a pivotal bearing for the link 6, whereby a flexible connection is insured.

A second plate 7, preferably corresponding generally in outline to the plate 2 and having similar openings 8 therein for securing the plate in position, is provided with a resilient hook 9 adapted to receive and retain in position a portion of the pivoted link 6. The hook 9 is preferably provided with a locking lug or projection 10, preventing the accidental disengagement of the link therefrom.

Figure 3:
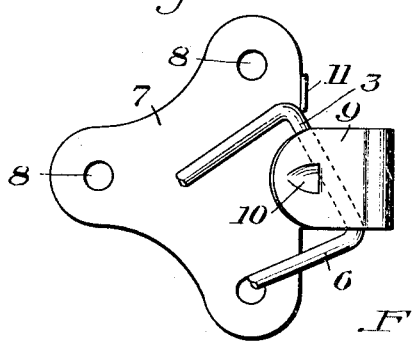
Fig. 3 is a view of a portion of the fastener illustrating the manner of disengaging the parts.
Figure 4:
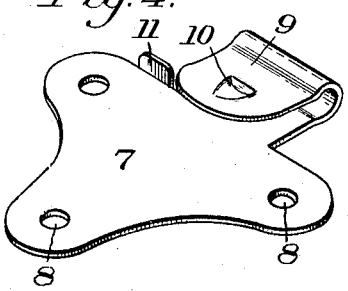
Fig. 4 is a perspective view of one of the plates.

Formed on or suitably secured to the plate 7, adjacent one side of the hook 9, is a projection or tongue 11 adapted during engagement and disengagement of the link 6 with the hook 9 to act as a fulcrum facilitating such movement of the parts. It will be noted that the end of the link 6 which is engaged by the hook 9, is sufficiently wider than the hook 9 so that the side of the link may be brought into engagement with the fulcrum projection 11. As shown in the drawing, the cross-bar 3 of the link 6 which is engaged by the hook 9 is longer than the cross-bar of the link which is engaged by the tongue 5, the link being so shaped in order to give it the necessary width where it is engaged by the hook 9. When it is desired to engage the parts of the fastener the plate 2, together with its link, may be put into the position shown in the dotted lines of Fig. 1, so that one side of the link bears against the projection 11. Then by lifting the part 2 with its link upward from the position shown in dotted lines in Fig. 1, the end of the link will fulcrum against the projection 11 and will be thereby pressed into the hook 9 past the locking lug 10. When it is desired to disengage the parts, the plate 2 and the link 6 may be brought so that the link 6 engages the opposite side of the fulcrum projection 11, as shown in Fig. 3, so that by turning the link against the fulcrum projection 11 the link will be forced out beneath the locking lug 10. Due to this lever action secured by the use of the fulcrum, it will be obvious that comparatively little strain need be applied to the two parts of the fastener and the fabric connected with them, whereby the danger of tearing the fabric is obviated.

In Fig. 5 is illustrated a modification in which a fulcrum is provided for the disengagement of the link from the hook. In this modification, the fulcrum point is furnished by the edge of the hook 9 at the point indicated by reference numeral 12. It will be noted that the end of the link 6 is wider than the hook 9, and that the end of the link 6 is also wider than the distance between the locking lug 10 and the fulcrum point 12 at the edge of the hook. When the hook is to be disengaged, the link 6 is turned so that one end of the cross-bar 3 of the link is brought into engagement with the fulcrum point 12, as indicated in dotted lines in Fig. 5. Further turning of the link 6 against the point 12 as a fulcrum will cause the crossbar 3 to be pushed beneath the locking lug 10. In the modification shown in Fig. 5, the parts are adapted to be engaged by a straight pull exerted by the link 6 against the locking projection 10, which, as shown in the drawings, has its side toward the mouth of the hook 9 inclined at a gradual angle to facilitate easier engagement of the parts.

In Fig. 6 is illustrated another modification in which the hook and link are adapted to be engaged by a straight pull and to be disengaged by fulcrum action of the parts. As shown in Fig. 6, notches 13 are formed on the sides of the hook 9. To disengage the link 6 from the hook 9, it is turned so that one side of the link 6 is engaged at one of the fulcrum notches 13, as shown in Fig. 6, whereupon by a continued turning of the link 6 relatively to the hook 9, the link is forced out beneath the locking lug 10. In the modification shown in Fig. 6, the parts are engaged by the direct pull of the link 6 into the hook 9, the locking lug 10 being inclined so as to afford easy engagement. It will be noted that in the modification shown in Fig. 6, as well as in the forms shown in the other figures of the drawings, the length of the end bar of the link 6 is greater than the distance between the fulcrum point 13 and the locking lug 10, so that when the link 6 is turned against the fulcrum point 13 at one end of the cross-bar of the link, the cross-bar will be brought against and forced out under the locking projection 10 as shown in Fig. 6.

Figure 7:
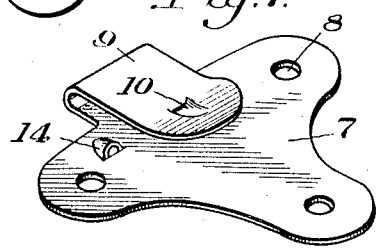
Fig. 7 is a perspective view of a modified plate.

In Fig. 7 is illustrated still another modification. In this modification the plate 7, upon which is formed a hook 10, has formed therein a fulcrum projection 14. This fulcrum projection is formed by pressing up the metal so as to leave a steep face at the back of the projection. This projection 14 is abreast of the locking lug 9. To disengage the link from the hook, the link is turned against the face of the locking lug 14 as a fulcrum and thereby twisted out beneath the locking lug 10.

While I have specifically illustrated and described the preferred embodiment of my invention, it will be understood that the invention is not limited to its illustrated embodiment, but may be embodied in other structures within the scope of the following claims.

I claim:

1. A flexible fastener, comprising a plurality of plates, a link pivotally carried by one of said plates, a hook carried by the other of such plates for receiving said link, and means on such last mentioned plate adapted to coöperate with said link during the engagement and disengagement thereof with the hook, substantially as described.

2. A separable fastener, comprising a plurality of members, a link pivotally carried by one of said members, a hook carried by the other of said members for receiving said link, a locking depression formed in said hook for maintaining said link in position therein, and a projection on said last mentioned member adjacent one side of the hook adapted to serve as a fulcrum for said link during engagement and disengagement thereof with the hook, substantially as described.

3. A separable fastener, comprising one member having a link, and a second member having a resilient hook provided with a locking lug for receiving the link, and having a fulcrum against which the link may be turned to force the link past the locking lug to disengage the parts, substantially as described.

4. A separable fastener, comprising one member having a link, and a second member having a hook for receiving the link, the end of the link engaged by the hook being wider than the hook, said second member having a fulcrum against which the link may be turned to disengage it from the hook, substantially as described.

5. A separable fastener, comprising one member having a link, and a second member having a hook provided with a locking lug for receiving the link and having a fulcrum against which the link may be turned to disengage it from the hook, the end of the link engaged by the hook being wider than the distance between the locking lug and the fulcrum, substantially as described.

6. A separable fastener comprising one member having a link, a second member having a hook provided with a locking lug for receiving the link and having a fulcrum thereon substantially abreast of the locking lug against which the link may be turned to disengage it from the hook, substantially as described.

In testimony whereof I have hereunto set my hand.

WILLIAM A. SCHLEICHER.